United States Patent [19]
Hodges

[11] Patent Number: 4,743,158
[45] Date of Patent: May 10, 1988

[54] PORTABLE TOWING TRAILER

[76] Inventor: Edward A. Hodges, 4425 Creemore Dr., Charlotte, N.C. 28213

[21] Appl. No.: 413

[22] Filed: Jan. 5, 1987

[51] Int. Cl.⁴ .............................................. B60P 3/06
[52] U.S. Cl. .................... 414/563; 414/559; 280/402
[58] Field of Search ............... 414/563, 475, 476, 559, 414/484, 485, 494; 280/402, 43.17, 43.23

[56] References Cited

U.S. PATENT DOCUMENTS

| | | | |
|---|---|---|---|
| 2,647,758 | 8/1953 | Ryan | 280/43.23 |
| 2,699,267 | 1/1955 | Beamer | 414/563 |
| 4,317,579 | 3/1982 | Louw | 280/402 |

FOREIGN PATENT DOCUMENTS 1232032 1/1967 Fed. Rep. of Germany ...... 280/402

Primary Examiner—Robert J. Spar
Assistant Examiner—Vien Nguyen
Attorney, Agent, or Firm—Clifton Ted Hunt

[57] ABSTRACT

A portable vehicle towing trailer is small enough and light enough for one person to put it in and take it out of a pickup truck. A winch is mounted for slidable movement along a beam supported by a wheeled axle, and the axle is connected to the mounting for the winch and to the beam to selectively lower the rear end of the beam to attach one end of a disabled vehicle and to raise the rear end of the beam to elevate the attached end above the ground and tow the disabled vehicle, all while the front end of the beam is connected to a tow vehicle.

5 Claims, 3 Drawing Sheets

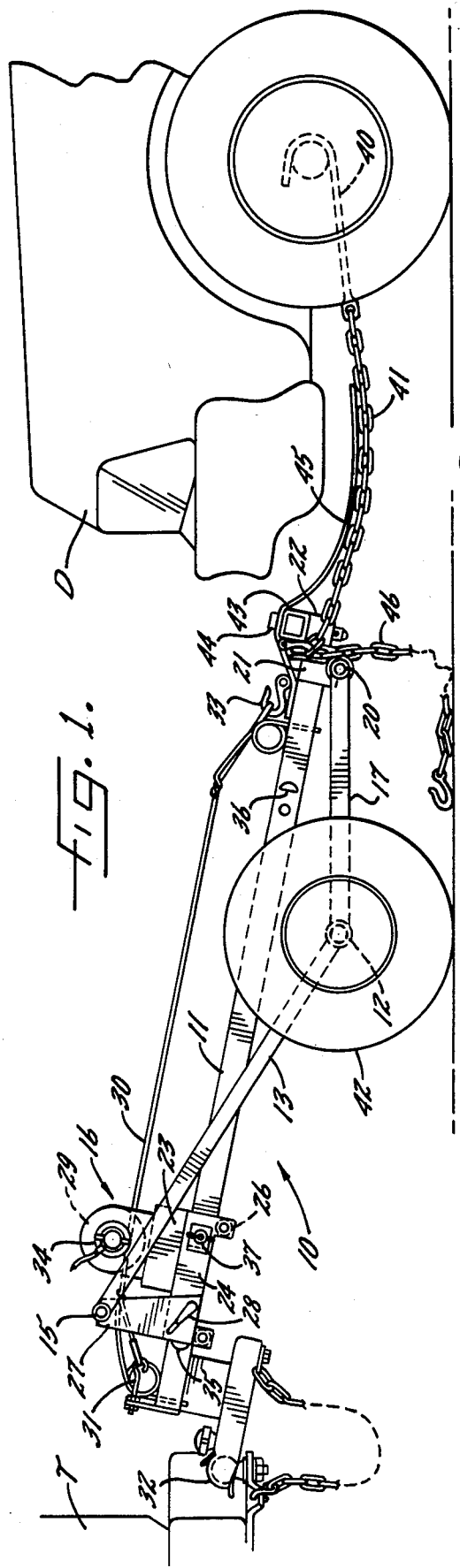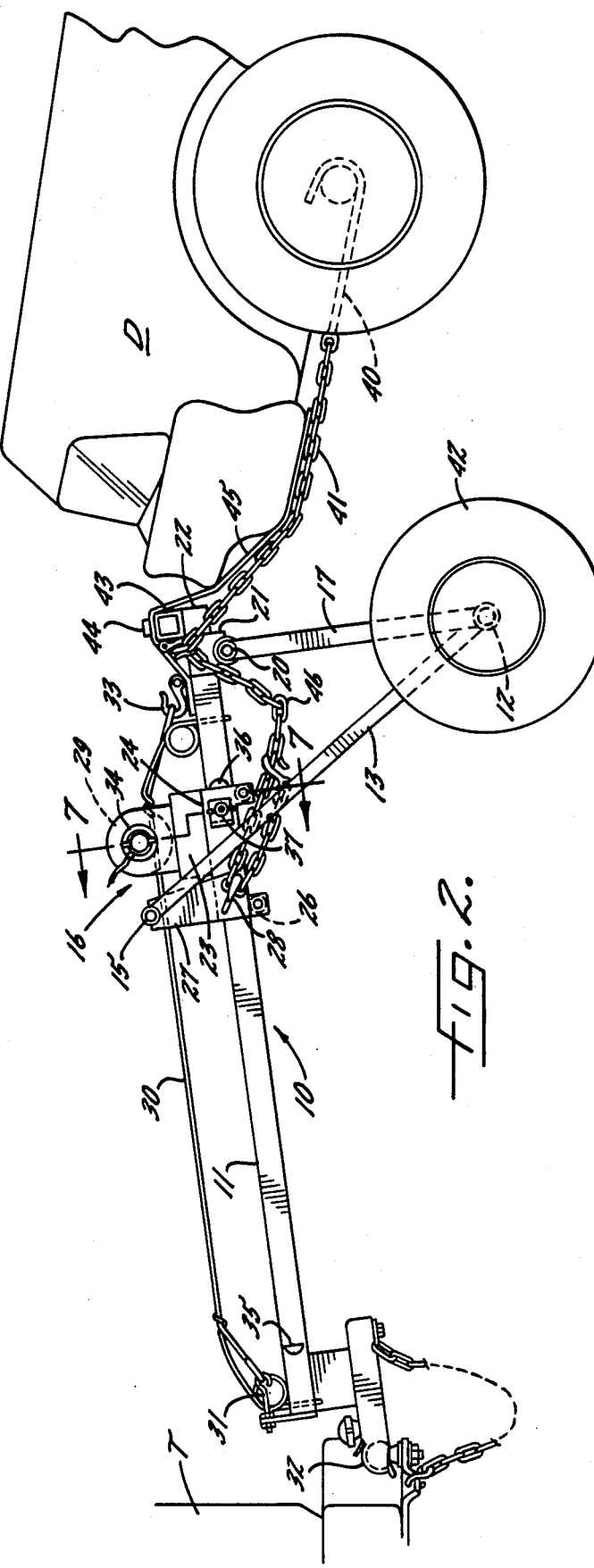

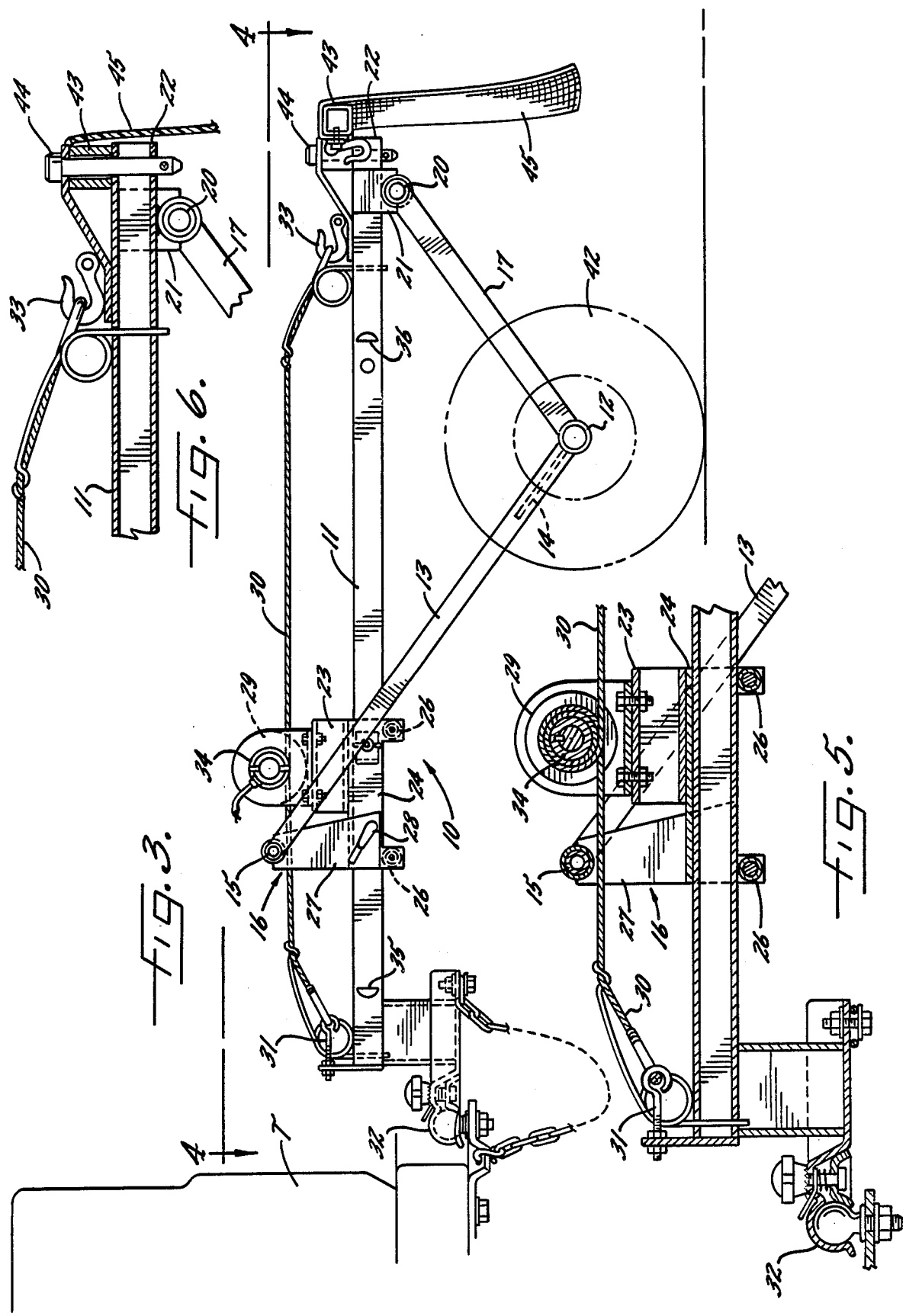

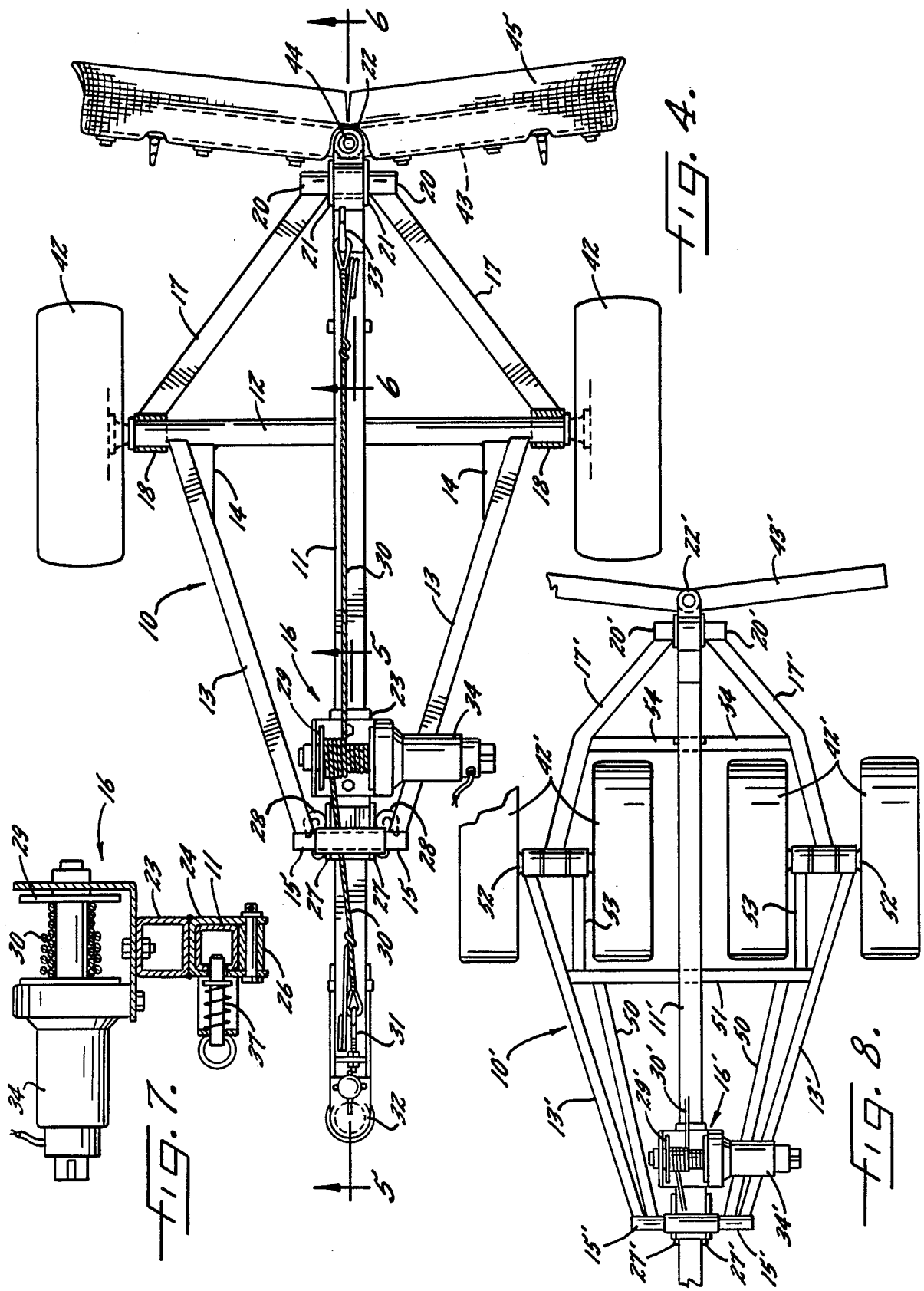

PORTABLE TOWING TRAILER

FIELD OF THE INVENTION

This invention relates to vehicle towing trailers and more particularly to a lightweight or portable vehicle towing trailer which is small enough to be stored in a pickup truck when not in use and light enough for one person to put the towing trailer in and take it out of a pickup truck.

BACKGROUND OF THE INVENTION

Conventional wreckers for towing disabled cars are very expensive, and this fact has created a market for a less expensive towing trailer which can be quickly and conveniently attached to a standard trailer hitch on the back of a towing vehicle, such as a pickup truck, and used to tow a disabled vehicle.

Exemplary disclosures of the prior art are shown in U.S. Pat. No. 3,417,890 issued Dec. 24, 1986, to Kichisaburo Yamazaki for TRAILER FOR TOWING CARS; U.S. Pat. No. 3,721,356 issued Mar. 20, 1973, to John M. McNeill for VEHICLE TOWING DEVICE; and U.S. Pat. No. 3,841,506 issued Oct. 15, 1974, to William M. Smith for TOW TRAILER FOR VEHICLES.

The Yamazaki tow trailer comprises an elongated beam on which a transverse wheeled frame and a transverse support frame are longitudinally slidable as by a chain block and cable. The operation of the Yamazaki TOW TRAILER is a multi-step operation requiring the trailer to be disconnected from the tow vehicle while initially connecting the disabled vehicle and manipulation of the tow trailer relative to the disabled vehicle after the tow trailer is reconnected to the tow vehicle. It is a needless and time-consuming operation.

McNeill discloses a tow trailer having a horizontal frame with a trailer coupling at one end and supporting wheels at the other end. An upright member extends perpendicularly from the horizontal frame above the wheels, and a winch and cable raise a pivoted arm to lift one end of a disabled vehicle off the ground. The McNeill trailer is short and wide with a high profile and a high concentration of weight in a limited area so that it is difficult, if not impossible, for one person to put it in and take it out of a pickup truck.

The Smith trailer has the same objection of concentrated weight and does not suggest the possibility of one person lifting the Smith trailer in and out of a pickup truck.

SUMMARY OF THE INVENTION

The portable trailer of the present invention is elongated in the manner of the Yamazaki trailer, but to a lesser extent. The overall length of the applicant's trailer is about five (5) feet (about 1.5 m) and, equipped with a manual winch, weighs about 150 pounds (about 68 kilograms). The overall width of the tow trailer is about forty (40) inches or about one (1) meter, and the wheels are spaced about a foot and a half (1½ feet or about 0.46 m) from the rear of the trailer in its retracted position. The empty tow trailer can be pulled behind a tow vehicle instead of being stored in it, when desired. Because of the distribution of weight, one person can lift one end of the present trailer and put it in the back of a pickup truck and then lift the other end of the trailer and load the trailer in the truck.

Unlike the Yamazaki Trailer, the present tow trailer is attached to the tow vehicle while a disabled vehicle is initially connected to the tow trailer. The tow trailer and tow vehicle remain connected while the tow trailer is used to elevate one end of a disabled vehicle for towing. Applicant's tow trailer is in its retracted position while a disabled vehicle is initially connected to it with conventional J-hooks and chains. The winch is then activated to slide along an elongated beam and elevate one end of the disabled car for towing while moving the wheels to the rear of the trailer to provide a snug connection of the disabled vehicle for towing.

The towing of a disabled vehicle with the present trailer is a simple two-step process comprising (1) attachment of the disabled vehicle to the tow trailer with the usual J-hooks and chains and (2) activating the winch to elevate the disabled vehicle while simultaneously moving the tow trailer wheels into towing position.

BRIEF DESCRIPTION OF THE DRAWINGS

FIG. 1 is a side elevation of the tow trailer connected to a tow vehicle and illustrating the tow trailer in its retracted position for initial attachment to a disabled vehicle;

FIG. 2 is a side elevation similar to FIG. 1 but showing the tow trailer in its elevated or active towing position and showing the attached end of the disabled vehicle elevated above the ground for towing;

FIG. 3 is a side elevation of the tow trailer attached to a tow vehicle and illustrating the tow trailer in partially elevated position;

FIG. 4 is a plan view of the tow trailer taken substantially along the line 4—4 in FIG. 3;

FIG. 5 is a sectional view taken substantially along the line 5—5 in FIG. 4;

FIG. 6 is a sectional view taken substantially along the line 6—6 in FIG. 4;

FIG. 7 is a sectional view taken substantially along the line 7—7 in FIG. 2; and FIG. 8 is a top plan view, with parts broken away, of a modified embodiment of the tow trailer.

DETAILED DESCRIPTION OF THE INVENTION

Referring more specifically to the drawings, the tow trailer is broadly indicated at 10 and comprises an elongated tubular beam 11 which is rectangular in cross section and pivotally connected to an axle 12 in variably spaced relation beneath the beam 11.

The pivotal connection of the axle 12 and beam 11 includes a pair of push arms 13 fixed against movement relative to the axle 12 by gussets 14 and pivotally connected as at 15 to the forward upper end of a carriage broadly indicated at 16 and mounted for reciprocal movement between the ends of the beam 11.

A pair of support arms 17 are pivotally connected as at 18 to the axle 12 (FIG. 4) and extend rearwardly therefrom in a substantially horizontal plane when the tow trailer is in the inactive or retracted position of FIG. 1. The rear ends of the support arms 17 are pivotally connected as at 20 to a bracket 21 secured to the beam 11 near its rear end 22. The support arms 17 are moved to the substantially vertical position of FIG. 2 and elevate the rear end of the beam 11 to its extended or towing position when the carriage 16 is moved rearwardly from its forward position of FIG. 1 to its FIG. 2 position.

The illustrated embodiment of the carriage 16 comprises a short length of rectangular tubular steel 23 fixed as by welding along one side to a longer rectangular tubular slide member 24 extending around the top and sides of rectangular beam 11 as perhaps most clearly seen in FIG. 7. Movement of the slide member 24 and its carriage 16 along the beam 11 may be facilitated by a pair of rollers 26 journaled in lugs depending from the sides of slide member 24.

The carriage 16 also includes a bracket 27 welded to the forward end of the slide member 24, and to which the pivot pin 15 is journaled. Safety hooks 28 are welded to the bracket 27.

A winch 29 is fastened to the tubular steel portion 23 of carriage 16. The winch 29 is illustrated as being electrically operable but it may be manually operable, if desired. A cable 30 is fastened at one end to a hook 31 at the front end of the beam 11 adjacent a trailer coupling 32 for attaching the tow trailer 10 to a tow vehicle T. The cable 30 extends rearwardly from the hook 31 and is wrapped around the sheave of the winch several turns before proceeding rearwardly to a hook 33 fixed to the beam 11 adjacent its rear end 22.

The winch 29 is reversible to selectively reciprocate the carriage 16 along the beam 11 between the extreme forward (retracted) position of FIG. 1 and the extreme rearward (extended) position of FIG. 2. An opening 35 in the side of beam 11 marks the forward position of the carriage 16 and another opening 36 in the side of beam 11 marks the extreme rearward position of the carriage. A spring-pressed plunger 37 is carried by the slide member 24 and is receivable within the openings 35 and 36 to releasably retain the carriage at a selected position.

After one end of a disabled vehicle D has been initially connected to the tow trailer by J-hooks 40 and chains 41 as shown in FIG. 1 and it is desired to elevate the trailer and the disabled vehicle into the towing position of FIG. 2, the plunger 37 is pulled outwardly to remove it from the opening 35 and release the carriage 16.

The winch 29 is then activated to wind up the cable 30 from the rear of the beam 11 while paying off the cable to the front of the beam. The carriage 16 is thereby moved rearwardly along the beam 11 as the winding of the cable on the sheave from the rear of the beam pulls against the hook 33 to raise that portion of the beam adjacent the pivotal connection 20 of the support arms 17 extending rearwardly from the axle 12 in FIG. 3. At the same time, the arms 13 push against the axle 12 to move the wheels 42 of the trailer from the medial position of FIG. 1 toward the towing position of FIG. 2 beneath the rear end 22 of beam 11.

As the carriage 16 progresses toward the rear 22 of beam 11 and the push arms 13 push the wheels 42 toward the rear of the trailer, the support arms 17 are moved from the substantially horizontal position of FIG. 1 to the past vertical position of FIG. 2. The rear of the beam 11 and the attached end of the disabled vehicle D are thereby elevated to the towing position of FIG. 2.

The chains 41 connect the J-hooks 40 to a transverse tow bar 43 pivoted as at 44 to the rear end 22 of the beam 11. A rubber mat 45 depends from the tow bar 43 to protect the disabled car from damage while being towed. Safety chains 46 connect the disabled vehicle to the hooks 28 on the carriage 16 and safety chains 47 connect the trailer to the tow vehicle T in the usual manner. After the disabled vehicle D has been towed to its destination, the safety chains are disconnected, the plunger 37 is removed from opening 36, and the winch is activated to move the carriage 16 toward the front of the trailer and return the trailer to its retracted position of FIG. 1 for removal of the J-hooks and detachment of the disabled vehicle.

The capacity of the trailer thus far described is about 4,000 pounds. FIG. 8 illustrates a modified form of the invention which can carry larger loads by utilizing four wheels $42^1$ and a reenforced frame. The other parts of the embodiment of FIG. 8 correspond to like parts of the previously described embodiment and are indicated by the same reference characters with the prime notation added. A further description of those parts is deemed unnecessary.

Push arms $13^1$ are supplemented by inwardly spaced auxiliary push arms 50 pivoted at their forward ends as at $15^1$ to the bracket $27^1$ on the carriage $16^1$. An auxiliary transverse frame member 51 extends between the push arms $13^1$ and secures the rear ends of the auxiliary push arms 50. Frame member 51 is pivotally connected to stub axles 52 by frame members 53. Auxiliary frame member 54 extends between and is fixed to pivotal support arms 171 rearwardly of the wheels $42^1$. The trailer is thus strengthened to support heavier loads, but operates in the same manner as the first described embodiment of the invention.

Although specific terms have been used in describing the invention, they are used in a descriptive sense only and not for purposes of limitation.

I claim:

1. A portable vehicle tow trailer small enough and light enough for one person to put it in and out of a pickup truck, said trailer comprising an elongated beam, a coupling at the front end of the beam for attachment to a tow vehicle, means at the other end of the beam for attaching and supporting one end of a disabled vehicle, a wheeled axle extending transversely of the beam, means for lowering the rear end of the beam below its front end while the front end of the beam is connected to a tow vehicle, means for elevating the rear end of the beam above its front end to tow a disabled vehicle, a tow bar at the rear end of the beam, means for attaching a disabled vehicle to the tow bar, a carriage slidably mounted on the beam, a winch having a sheave fixed to the carriage for movement therewith, a cable extending about the sheave and the ends of the cable being fixed to the front and rear ends of the beam, a push arm extending between the carriage and the axle, a support arm extending between the axle and the rear end portion of the beam, and means to activate the winch to wind up cable from one end of the beam and pay off cable to the other end of the beam and move the carriage relative to the beam, whereby movement is imparted to the push arm and to the support arm to selectively adjust the beam to a retracted position or to an extended towing position.

2. In a vehicle tow trailer having a beam with a trailer coupling at its front end for attachment to a tow vehicle and means for attaching one end of a disabled vehicle to the rear end of the beam and a wheeled axle beneath the beam, the combination of means for lowering the rear end of the beam to attach the disabled vehicle while the front end of the beam is attached to the tow vehicle, means for elevating the rear end of the beam and the attached end of the disabled vehicle to towing position, said means for lowering and said means for elevating the rear end of the beam including a winch, means to move the winch along the beam, and means connecting the axle for movement with the winch.

3. A vehicle tow trailer according to claim 2 wherein said means for elevating the rear end of the beam comprises a support arm pivotally connected between the axle and the rear end portion of the beam.

4. In a vehicle tow trailer having an elongated beam with a trailer coupling at its front end for attachment to a tow vehicle and means for attaching a disabled vehicle to the rear end of the beam and a wheeled axle beneath the beam, the combination of a carriage slidable along the beam, means for moving the carriage between the ends of the beam, at least one push arm extending between the carriage and the axle for moving the axle with the carriage, and at least one support arm extending between the axle and the rear of the beam to elevate the rear of the beam as the carriage and the axle approach the rear of the beam.

5. A vehicle tow trailer according to claim 4 wherein said means for moving the carriage comprises a winch movable with the carriage and having a sheave with a cable extending about the sheave and fixed to the ends of the beam.

* * * * *